(12) United States Patent
Hale

(10) Patent No.: US 8,075,650 B2
(45) Date of Patent: Dec. 13, 2011

(54) SYSTEM, METHOD, AND APPARATUS FOR MOUNTING A FILTER BAG TO A WET/DRY VACUUM

(75) Inventor: Larry D. Hale, Warrenton, MO (US)

(73) Assignee: Emerson Electric Co., St. Louis, MO (US)

( * ) Notice: Subject to any disclaimer, the term of this patent is extended or adjusted under 35 U.S.C. 154(b) by 1029 days.

(21) Appl. No.: 11/870,280

(22) Filed: Oct. 10, 2007

(65) Prior Publication Data

US 2008/0086991 A1 Apr. 17, 2008

Related U.S. Application Data

(60) Provisional application No. 60/829,083, filed on Oct. 11, 2006.

(51) Int. Cl.
*B01D 57/00* (2006.01)
(52) U.S. Cl. ............ 55/378; 55/341.1; 55/379; 55/381; 55/418; 55/DIG. 26; 15/347; 15/323; 15/327.2; 15/353

(58) Field of Classification Search .................... 55/318, 55/342, 341.1, 361, 378, 379, 381, 418, 434, 55/DIG. 2, DIG. 26; 15/347, 353, 323, 327.2
See application file for complete search history.

(56) References Cited

U.S. PATENT DOCUMENTS

| 4,120,311 A * | 10/1978 | Dunham et al. .................. 134/6 |
| 4,367,565 A | 1/1983 | Parise |
| 4,578,840 A | 4/1986 | Pausch |
| 4,801,376 A | 1/1989 | Kulitz |
| 6,237,187 B1 * | 5/2001 | Hult et al. ........................ 15/323 |
| 6,451,078 B2 * | 9/2002 | Berfield et al. ................. 55/374 |
| 6,786,947 B2 | 9/2004 | Mountford |

* cited by examiner

*Primary Examiner* — Jason M Greene
*Assistant Examiner* — Karla Hawkins
(74) *Attorney, Agent, or Firm* — Locke Lord Bissell & Liddell LLP

(57) ABSTRACT

The present disclosure provides a method, apparatus, and system to mount a filter bag to a wet/dry vacuum cleaner by providing an adapter for mounting the filter bag to a drain opening in the wet/dry vacuum cleaner drum and restricting the typical vacuum port, forcing the vacuum materials to enter through the drain opening and into the bag. The lid of the wet/dry vacuum cleaner can be removed independently of the bag to avoid rupturing the bag. Further, the bag can rest on the bottom of the drum for support.

13 Claims, 11 Drawing Sheets

SYSTEM, METHOD, AND APPARATUS FOR MOUNTING A FILTER BAG TO A WET/DRY VACUUM

CROSS REFERENCE TO RELATED APPLICATIONS

This application claims the benefit of U.S. Provisional Application Ser. No. 60/829,083, filed Oct. 11, 2006, which is incorporated herein by reference.

FIELD

The present disclosure related to vacuum cleaners. More particularly, the disclosure relates to wet/dry vacuum cleaners.

BACKGROUND

The type of vacuum cleaners known as "wet/dry" vacuum cleaners can interchangeably suction either water or air. Thus, special structures accompany a wet/dry vacuum cleaner. Typically, a suction system with a motor creates the vacuum and is mounted in a lid that is removably attached to a collection drum. A portion of the lid, herein termed a mounting assembly, extends at least partially downward into the drum and mounts a filter support assembly and filter that generally covers a vacuum intake to the suction assembly in the lid. The collection drum receives the vacuumed materials in a loose unbagged state. The suction system in the lid suctions external air or water through a hose into an upper opening in the drum so that water or dirt is deposited throughout the drum below the opening. Remaining material, mainly air, then flows radially inward through the filter for filtering, continues through the filter support assembly into a suction impeller in the lid, and then is exhausted from the vacuum cleaner.

To empty the drum, the lid is removed and the drum is turned over to dump the contents into a waste container. Many larger wet/dry vacuum cleaners have a drain opening in the side of the drum at a low elevation. If the contents are primarily liquid, an operator can remove a drain opening cap from the drain opening to discharge the liquid contents into a waste container.

There is sometimes a desire for a paper filter bag for collecting fine, relatively dry debris. A number of non-wet/dry vacuum cleaners have a vacuum inlet transitioning into a tube that simply extends into a specially designed storage area where a paper filter bag can be placed and supported for such purposes. However, for a typical wet/dry vacuum cleaner, such capabilities are not enjoyed due to its multi-functional use. In the case of wet/dry vacuum cleaner where the vacuum inlet is integrated into the lid, it is impractical to install a paper filter bag on the inlet and then remove the lid and a full paper filter bag without rupturing the bag due to the suspended weight of the debris therein.

Therefore, there remains a need for a system, method, and device for mounting a filter bag to wet/dry vacuum cleaner.

SUMMARY

The present disclosure provides a method, apparatus, and system to mount a filter bag to a wet/dry vacuum cleaner by providing an adapter for mounting the filter bag to a drain opening in the wet/dry vacuum cleaner drum and restricting the typical vacuum port, forcing the vacuum materials to enter through the drain opening and into the bag. The lid of the wet/dry vacuum cleaner can be removed independently of the bag to avoid rupturing the bag. Further, the bag can rest on the bottom of the drum for support.

In one embodiment, the disclosure provides an adapter for mounting a filter bag to a collection drum in a wet/dry vacuum cleaner, comprising: an inlet attachable to an outside surface of the drum at an opening in the drum; an inner plate attachable to the inlet from an inside surface of the drum through the opening; an outer housing adapted to be coupled to the inner plate on an inside of the drum; and a flange holder adapted to be coupled to the outer housing and support a flange on the filter bag on the inside of the drum.

The disclosure also provides a method of mounting a filter bag in a drum of a wet/dry vacuum cleaner using an adapter, comprising: mounting a first portion of the adapter inside the drum and extending a first tube of the portion through an opening in the drum; mounting a second portion of the adapter outside the drum and coupling the second portion to the opening in the drum causing a second tube to extend through the opening from outside the drum and engage the first tube, and to couple the first tube and the second tube inside the opening in the drum; and mounting a filter bag to the first portion of the adapter inside the drum independently of a lid on the wet/dry vacuum cleaner.

BRIEF DESCRIPTION OF THE DRAWINGS

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art as required by 35 U.S.C. §112.

DETAILED DESCRIPTION

One or more illustrative embodiments incorporating the invention disclosed herein are presented below. Not all features of an actual implementation are described or shown in this application for the sake of clarity. It is understood that the development of an actual embodiment incorporating the present invention and numerous implementation-specific decisions must be made to achieve the developer's goals, including compliance with system-related, business-related and other constraints, which vary by implementation and from time to time. While a developer's efforts might be complex and time-consuming, such efforts would be, nevertheless, a routine undertaking for those of ordinary skill in the art having benefit of this disclosure.

Figure 1:
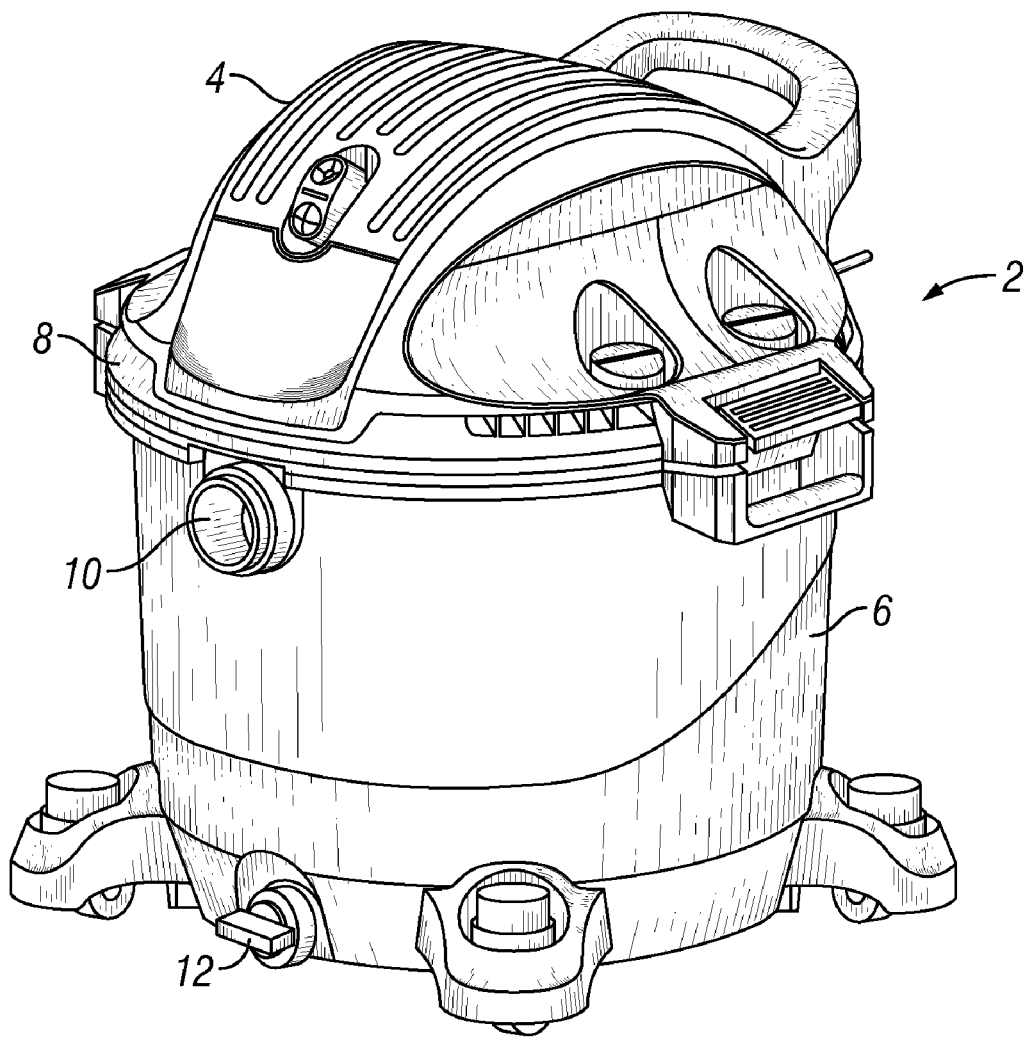
FIG. 1 is a perspective schematic view of an exemplary wet/dry vacuum cleaner with a drain opening.

FIG. 1 is a perspective schematic view of an exemplary embodiment of a wet/dry vacuum cleaner system. The exemplary system is a wet/dry vacuum cleaner 4 that includes a collection drum 6 and a lid 8 removably attached to the collection drum such that the lid can be removed to empty debris or liquids contained therein. As with known wet/dry vacuums, a motor is generally coupled to the mounting assembly on the inside portion of the lid 8, which is operable to create the vacuum inside the collection drum 6 to draw debris or liquid into the collection drum through a vacuum port 10 generally located at an upper portion of the drum wall under normal operating conditions. The collection drum further includes a drain 12 located at a lower portion of the drum wall, so that liquid can be emptied from the collection drum without removing the lid when the motor is off. The lid 8 of the vacuum cleaner 4 generally includes the mounting assembly, filter support assembly, and filter, all described in the background section, coupled to the underside of the lid.

Figure 2A:
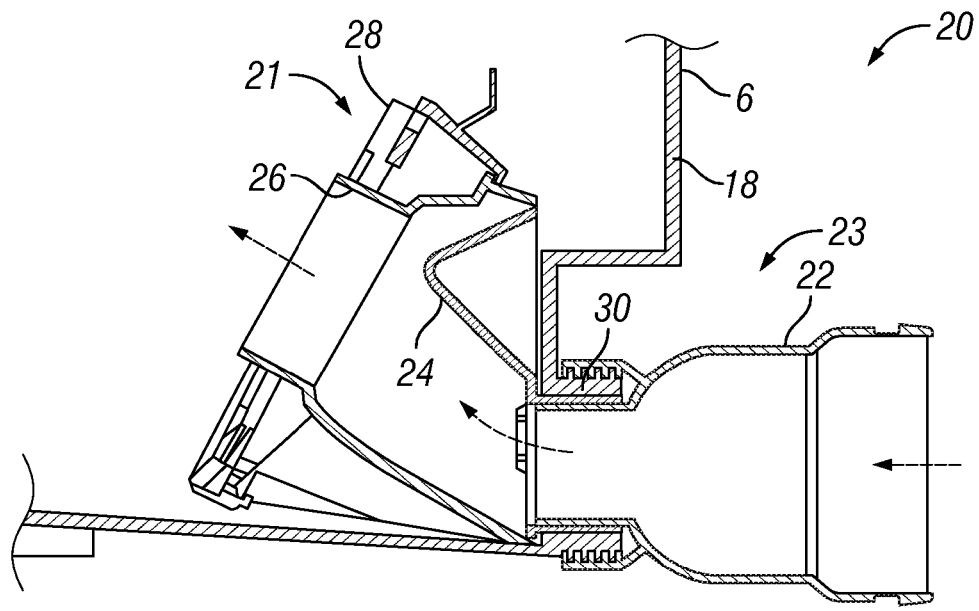
FIG. 2A is a cross sectional schematic view showing the adapter inserted through an opening in a vacuum cleaner collection drum.
Figure 2B:
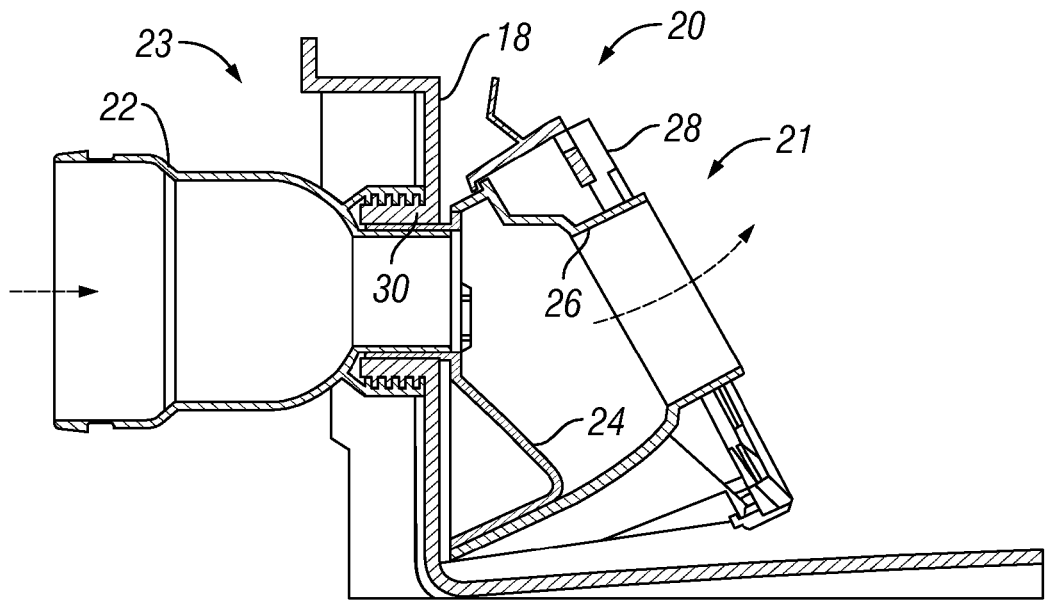
FIG. 2B is a cross sectional schematic view of the adapter coupled to an opening formed at a higher elevation in the drum relative to FIG. 2A.

FIG. 2A is a cross sectional schematic view showing the adapter inserted through an opening in a vacuum cleaner collection drum. FIG. 2B is a cross sectional schematic view of the adapter coupled to an opening formed at a higher elevation in the drum relative to FIG. 2A. The FIGS. 2A, 2B will be described in conjunction with each other. An adapter 20 is designed to use an opening 30 in the wall of the drum in the wet/dry vacuum cleaner. The opening could, for example, be the drain 12 shown in FIG. 1. The adapter is formed from multiple parts including a first portion that is mounted internal to the drum and a second portion mounted external to the drum and coupled to the first portion through the opening. While the different components will be described as individual components that are coupled to each other, it is to be understood that one or more of the components could be made integral to the other components to achieve the overall purpose of providing an adapter as described herein. The term "coupled," "coupling," and like terms are used broadly herein and can include any method or device for securing, binding, bonding, fastening, attaching, joining, inserting therein, forming thereon or therein, communicating, or otherwise associating, for example, mechanically, magnetically, electrically, chemically, directly or indirectly with intermediate elements, one or more pieces of members together and can further include integrally forming one functional member with another. The coupling can occur in any direction, including rotationally.

The adapter 20 can be used for existing wet/dry vacuum cleaners having an opening 30 or can be provided with new vacuum cleaners. In general, the adapter is located at a position in the drum such that a filter bag attached to the adapter can be at least partially supported by the adapter and, at least in some cases, supported by an inside bottom surface of the drum. The configuration allows the lid 8, shown in FIG. 1, to be removed in a generally understood manner for wet/dry vacuum cleaners without disturbing the integrity of the bag attached to the adapter and therefore to the drum in the vacuum cleaner shown in FIG. 1.

To force the vacuum through the opening 30 instead of through the typical vacuum port 10 shown in FIG. 1, a cap described below can be used to selectively cover the vacuum port. Thus, a vacuum source from the suction system generally located in the lid 8 will draw dirt and other vacuumed media through the adapter and into the filter bag for collection before passing the filtered air through the remainder of the vacuum system. As will be described in more detail below, the adapter uniquely provides interconnection using existing threads or other coupling means of the existing opening to couple the first portion 21 and second portion 23 together on the inside and outside of the drum wall.

In general, the adapter includes an inlet 22 disposed outside of the drum wall 18. The inlet is generally removably coupled to the opening 30. The second portion of the adapter, disposed on the inside of the drum wall 18, generally includes an inner plate 24 that is coupled to the inlet 22 through the opening 30. The inner plate can be coupled to an outer housing 26. The outer housing 26 forms a transition for the filter bag to be mounted thereon. A flange holder 28 is coupled to the outer housing 26. In at least one embodiment, the flange holder is hingeably attached to the outer housing. The flange holder supports a flange on the filter bag, shown in FIG. 8G, in cooperation with an outlet of the outer housing 26. As shown in FIG. 2A, the inner plate 24 can be mounted in one orientation when the opening 30 is at a lower elevation, such that insufficient space occurs below the opening. Conversely, as shown in FIG. 2B, the inner plate 24 can be reversed in its orientation when the opening 30 is at a higher elevation such that sufficient space below the opening allows the inner plate 24 to be disposed at least partially below the opening. In either example, the outer housing 26 can be oriented at the same orientation relative to the drum wall 18 and opening 30. The inlet 22 includes an end adapted to receive a vacuum hose or other attachment as would be generally used with a wet/dry vacuum cleaner. This end is distal from the other end that attaches to the opening 30. Thus, the vacuum substance will generally flow through the inlet 22 from outside the drum 18 through an opening in the inner plate 24 into the outer housing 26 and through the outlet of the outer housing 26 into a filter bag shown in FIG. 8G.

Figure 3A:
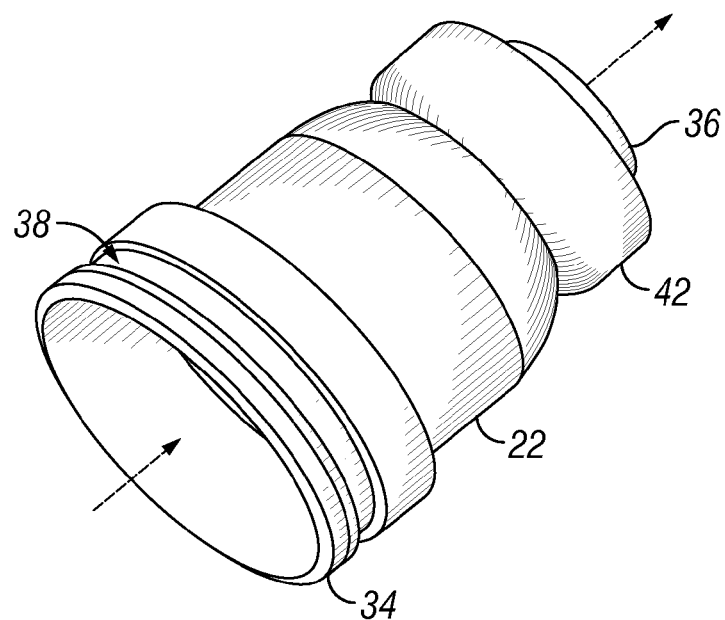
FIG. 3A is a perspective schematic view of the inlet from an outside view.
Figure 3B:
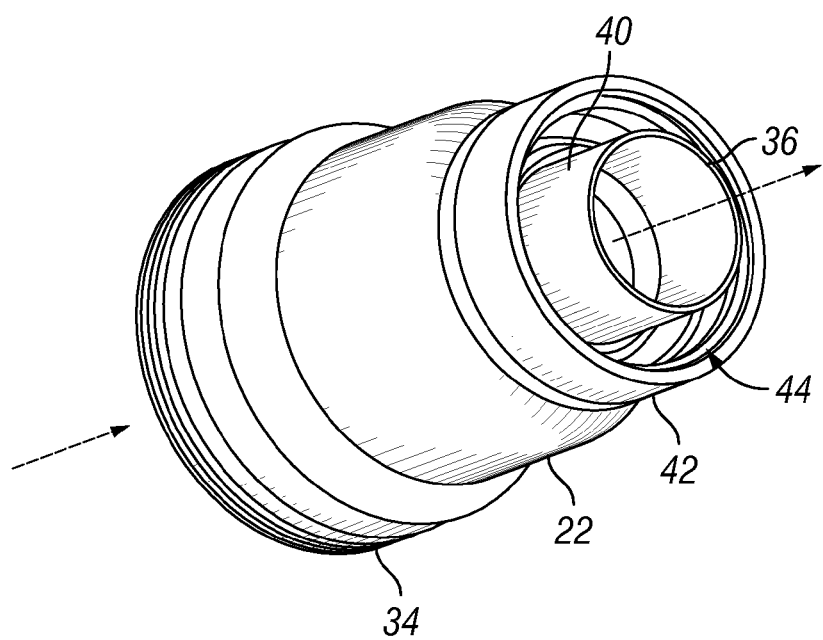
FIG. 3B is a perspective schematic view of the inlet from an opposite direction.

FIG. 3A is a perspective schematic view of the inlet from an outside view. FIG. 3B is a perspective schematic view of the inlet from an opposite direction. The figures will be described in conjunction with each other. Generally, the inlet can be a tubular product of various cross sections, such as circular or other geometric cross sections, with a first end 34 forming an entrance and a second end 42 forming an exhaust. The first end 34 can include a hose connector 38, such as a groove, ridge, or other device or formation. The hose connector 38 is adapted to be coupled with a vacuum hose or other tube external to the vacuum cleaner. The second end 42 includes a tube 36 that can be integral to the end 42 and attaches to the opening 30 in the drum, as described herein. The tube 36 includes an outer surface 40 that can be used to provide a seal with the inner plate 24 through the opening 30, as shown in FIG. 2A and described in further detail below. Further, the second end 42 can include a connector 44 that is adapted to connect the inlet 22 to the drum opening 30, shown in FIGS. 2A, 2B. In at least one embodiment, the connector can include internal threads adapted to mate with external threads on the opening 30. In such an embodiment, the inner diameter of the threads of the connection 44 would correspond to the outer diameter of the threads on the opening, and the outer periphery of the tube 36 along the surface 40 would generally correspond to or be less than the inner diameter of the opening 30.

Figure 4A:
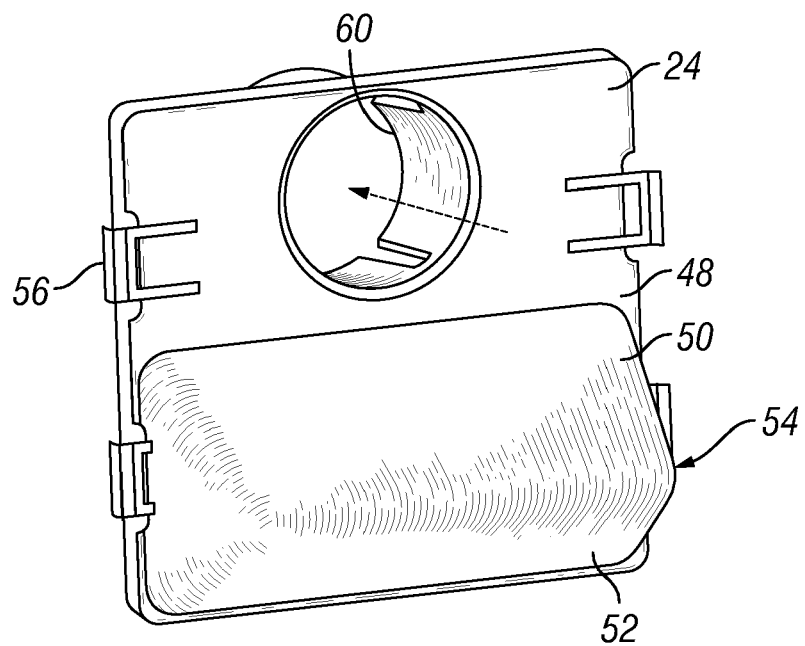
FIG. 4A is a perspective schematic view of an inner plate.
Figure 4B:
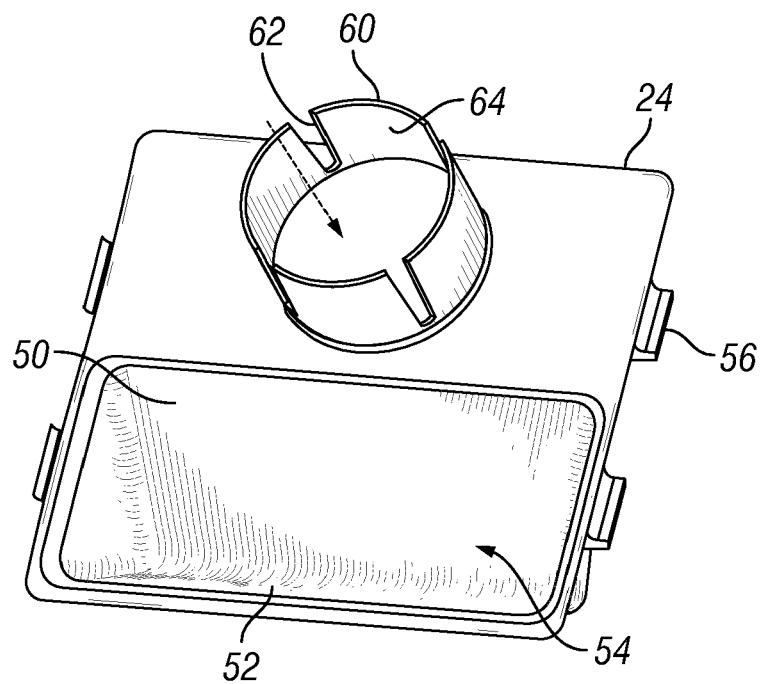
FIG. 4B is a perspective schematic view of the inner plate from the opposite direction.

FIG. 4A is a perspective schematic view of an inner plate. FIG. 4B is a perspective schematic view of the inner plate from the opposite direction. The figures will be described in conjunction with each other. In at least one embodiment, the inner plate comprises of a thin plate with a tube that extends into the opening in the drum. The inner plate 24 generally includes a plate 48, a first ramp plate 50, and a second ramp plate 52. The first and second ramp plates form an angled ramp 54. The combination of the shape and positioning in the outer housing described herein assists in minimizing debris filling the flow passages in the adapter such as the outer housing and reducing re-circulation to provide a more efficient flow-through. The inner plate 24 further includes one or more connectors 56, such as a tab, that can be coupled with the outer housing.

The inner plate can further include a compression tube 60. The compression tube in at least one embodiment is adapted to be placed into the inner surfaces of the opening 30 shown in FIGS. 2A, 2B. To facilitate expansion and contraction of the tube in the opening, the compression 60 can have one or more slots 62 formed longitudinally along the sidewall of the compression tube. In at least one embodiment, the compression tube 60 has an inner surface that can be at least slightly larger than the external surface 40 of the tube 36 on the inlet 22, shown in FIG. 3B. The interaction of the compression tube 60 with the tube 36 facilitates the engagement of the inner first portion of the adapter with the outer second portion of the adapter through the opening 30, described in further detail below.

Figure 5A:
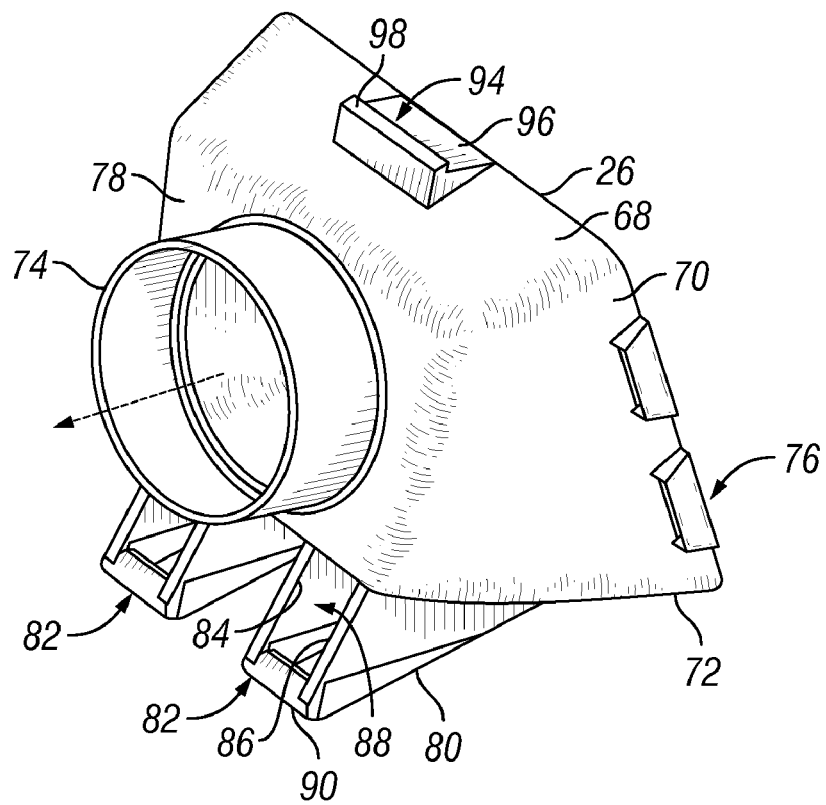
FIG. 5A is a perspective top schematic view of an outer housing.
Figure 5B:
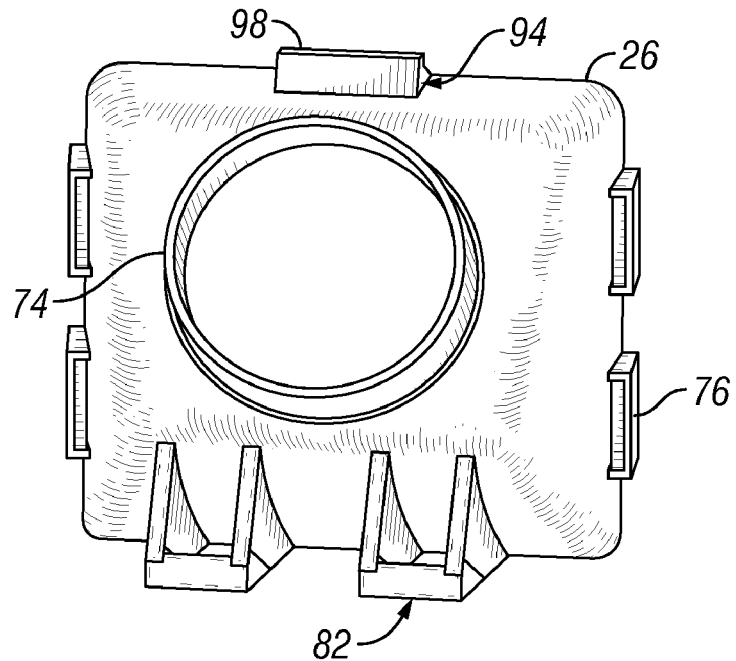
FIG. 5B is a perspective schematic view of the outer housing from a viewpoint inside the drum outwardly.

FIG. 5A is a perspective top schematic view of an outer housing. FIG. 5B is a perspective schematic view of the outer housing from a viewpoint inside the drum outwardly. The figures will be described in conjunction with each other. In general, the outer housing facilitates redirecting the incoming airflow from the opening 30 into a filter bag. The outer housing 26 generally includes a top 68, sides 70, and a bottom 72. The top, bottom and sides converge toward a back 78. An outlet 74 is disposed through the back 78 and directed toward an inward volume of the drum of the vacuum cleaner, discussed above. The outlet 74 is adapted to contact and seal with a filter bag opening through an elastic membrane on the filter bag, as shown in FIG. 8G below.

The outer housing 26 can further include a foot 80. The foot 80 in at least one embodiment generally includes a first side 84 and a second side 86 spaced from the first side 84 to form a hinge opening 88 therebetween. A cross member 90 is coupled to one or more of the sides 84, 86. The cross member 90 forms a rotational point for a hinge located on the flange holder, described in more detail below.

The outer housing 26 can further include one or more receivers 76. The receiver 76 is adapted to receive the connector 56 coupled to the inner plate 24 described above. In general, a plurality of receivers is used to receive a plurality of connectors 56. In at least one embodiment, the receivers and corresponding connectors are symmetrically disposed so that the inner plate can be rotated 180 degrees and still be coupled to the outer housing.

Further, the outer housing can include a latch portion 94. The latch portion 94 generally includes a base 96 with an extension 98 extending upwardly from the base 96. The latch portion is adapted to be removably coupled with the flange holder 28 described below.

Figure 6A:
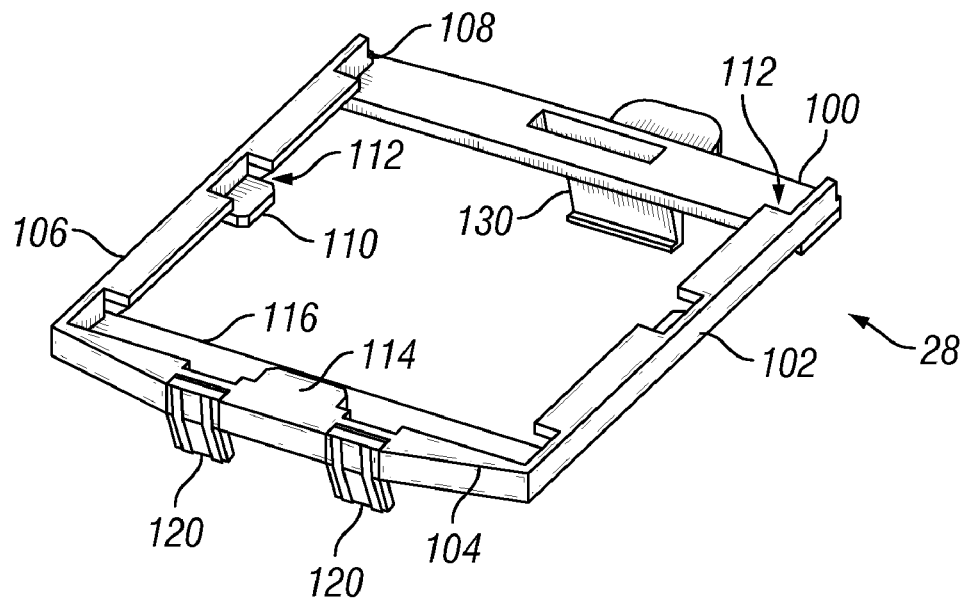
FIG. 6A is a perspective schematic view of a flange holder from inside the drum in an outward direction.
Figure 6B:
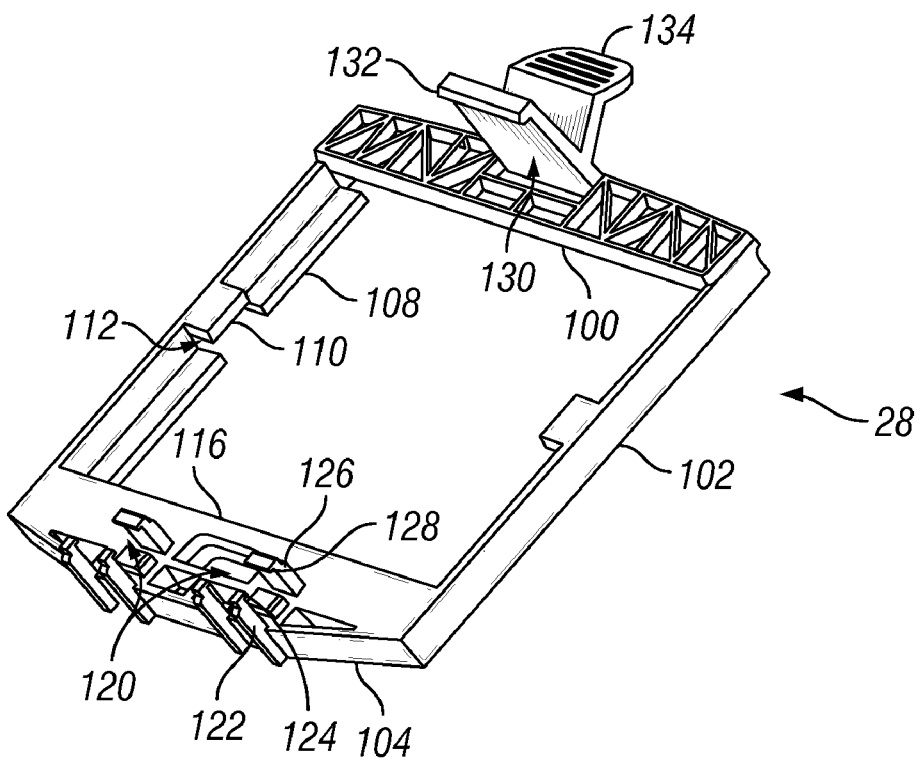
FIG. 6B is a perspective schematic view of the flange holder from the opposite direction.

FIG. 6A is a perspective schematic view of a flange holder from inside the drum in an outward direction. FIG. 6B is a perspective schematic view of the flange holder from the opposite direction. The figures will be described in conjunction with each other. The flange holder 28 generally includes a top 100, side 102, bottom 104, second side 106. The sides 102, 106 generally include an upper first flange 108 and a lower second flange 110. The upper flange and lower flange are spaced a distance to form a channel 112 therebetween. The channel 112 is dimensioned to slidably receive a flange on a filter bag, shown in FIG. 8G below. Similarly, the bottom 104 generally includes an upper first flange 114 and a lower second flange 116 spaced a certain distance to form a channel, similar to channel 112. Thus, in general, the top 100, lower second flange 110, lower second flange 116 are co-planer to form a lower mounting support surface for a flange on a filter bag. Similarly, the upper first flange 108 and upper first flange 114 are co-planer to form an upper mounting support surface for the flange on the filter bag.

The flange holder 28 further includes a mating hinge portion 120. The hinge portion 120 is adapted to be coupled with the hinge portion 82 on the outer housing 26, shown in FIGS. 5A, 5B. More particularly, the hinge portion 120 can include a lower hinge support 122 with an upwardly extending hinge extension 124. The hinge portion 120 can further include an upper hinge support 126 having a downwardly extending hinge extension 128. The lower hinge support 122 and upper hinge support 126 are generally spaced a distance from each other to allow for engagement over the cross member 90 of the foot 80 of the outer housing 26, shown in FIGS. 5A, 5B. Thus, the mounting flange 28 can be hingeably coupled with the outer housing 26 by engagement of the hinge portion 120 with the hinge portion 82.

The flange holder 28 can further include a mating latch portion 130 adapted to be selectively coupled with the latch portion 94 on the outer housing 26, shown in FIGS. 5A, 5B. The latch portion 130 can include a latch extension 132 adapted to engage the latch extension 98 on the housing 26. A convenient release 134 can be coupled to the latch portion 130 to assist in selectively disengaging or engaging the latch portion 94 of the outer housing.

Figure 7A:
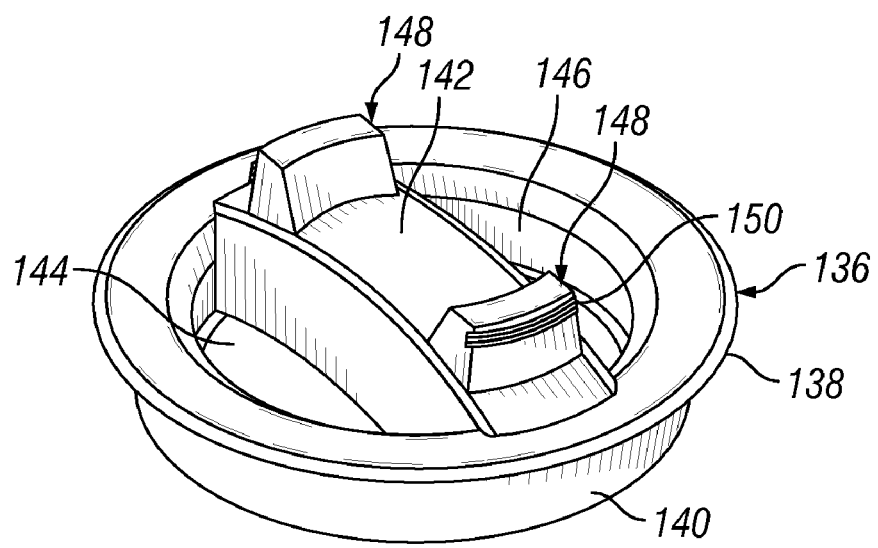
FIG. 7A is a top perspective schematic view of a cap adapted to cover a vacuum port in the vacuum cleaner.
Figure 7B:
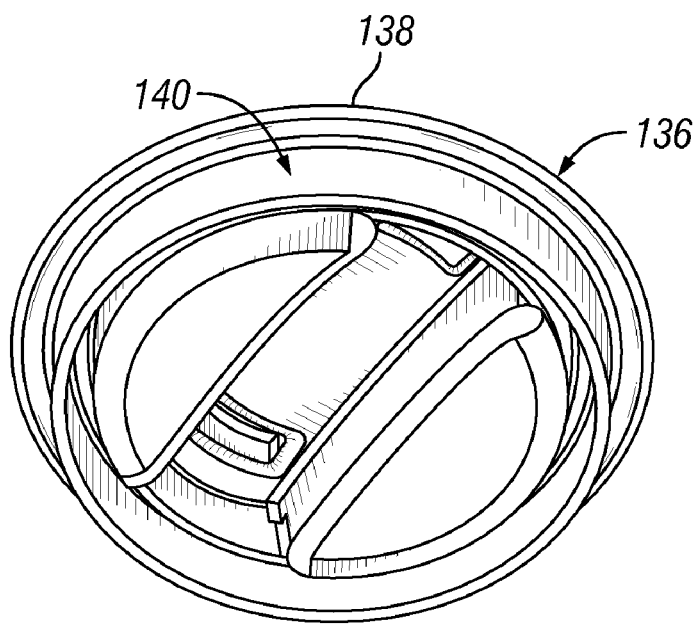
FIG. 7B is a bottom perspective schematic view of the cap.

FIG. 7A is a top perspective schematic view of a cap adapted to cover a vacuum port in the vacuum cleaner. FIG. 7B is a bottom perspective schematic view of the cap. The figures will be described in conjunction with each other. A wet/dry vacuum cleaner normally provides suction through the vacuum port 10 described in FIG. 1. To effectively utilize the adapter 20 herein, this vacuum port can be sealed with a cap 136 to force a vacuum flow through the opening 30, shown in FIGS. 2A, 2B. In general, the cap 136 includes a flange 138 that assists in restricting insertion of the cap too far into the opening 30, with a sealing surface 140 sized to seal against the inside surface of the opening 30. For added convenience, the cap can include a rib 142 that forms a pair of recesses 144, 146 for handling. The rib 142 can further include one or more extensions 148. The extension 148 can include a connector 150 formed to engage and be coupled with the opening 30 to seal the opening 30, for example, when the vacuum port 10 is to be used in a customary manner.

Figure 8A:
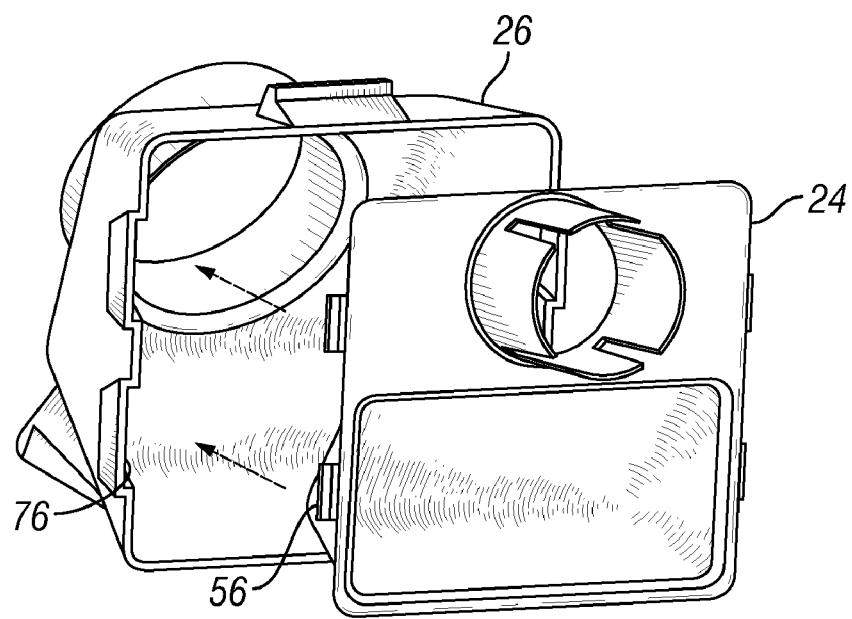
FIG. 8A is a perspective schematic view of the inner plate coupled to the outer housing.
Figure 8B:
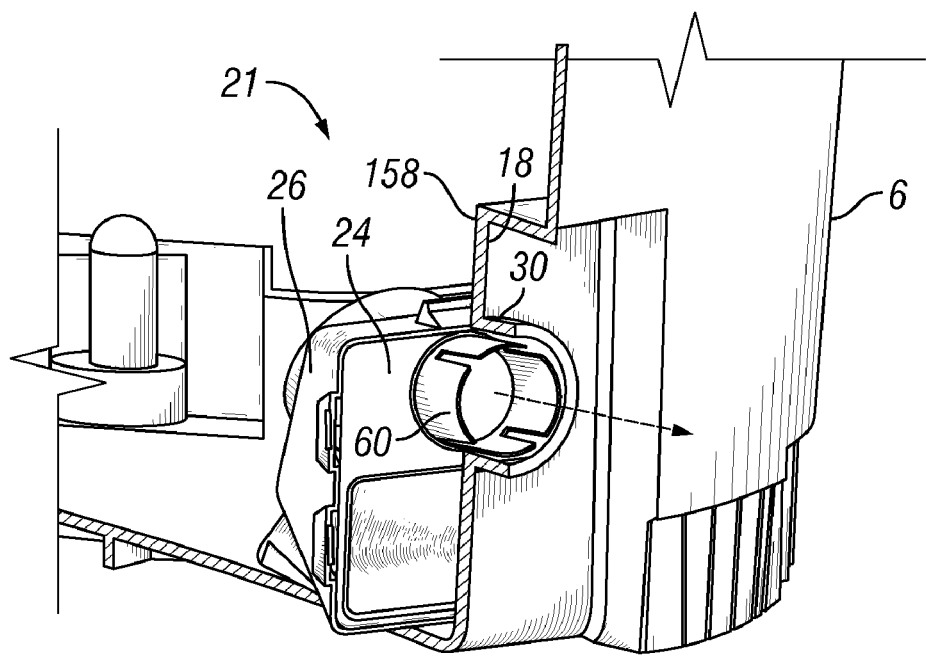
FIG. 8B is a perspective schematic view of the inner plate and outer housing coupled to the drum opening.
Figure 8C:
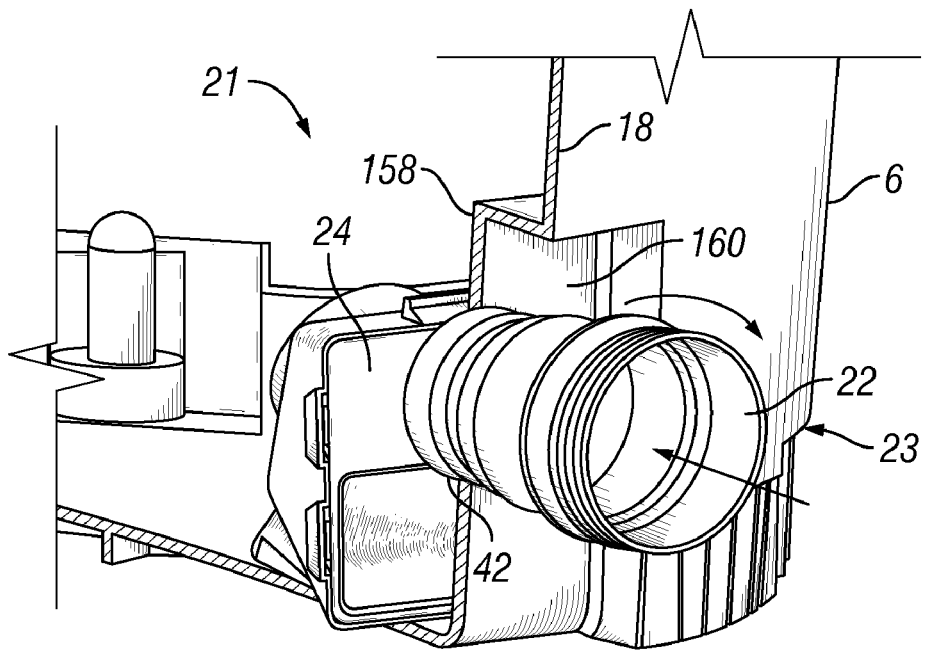
FIG. 8C is a perspective schematic view of the inlet coupled to the drum opening and the inner plate.
Figure 8D:
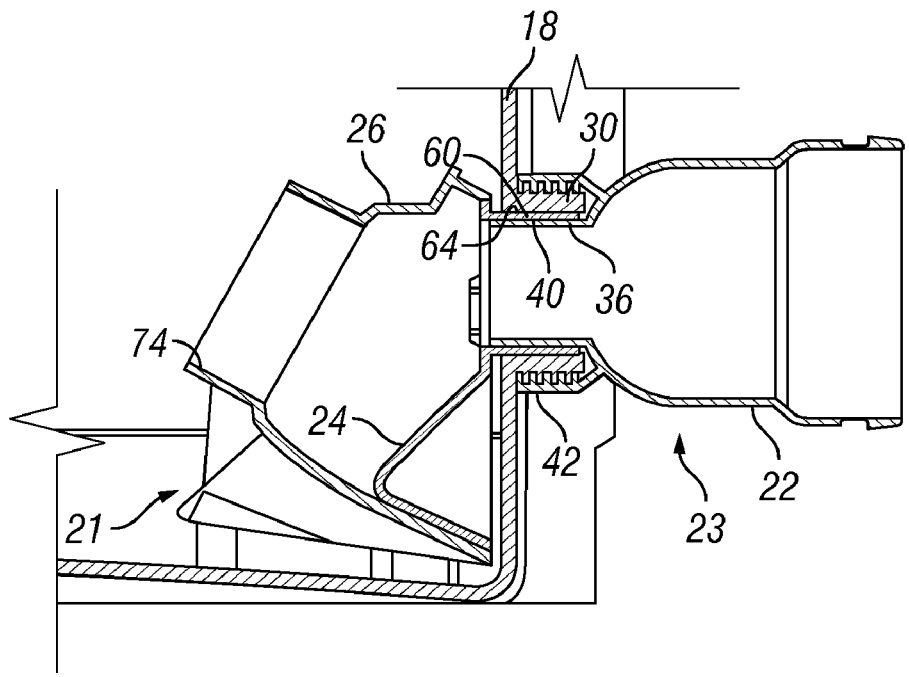
FIG. 8D is a cross sectional schematic view of the inner plate and outer housing coupled to the inlet on opposite sides of the drum opening 30.
Figure 8E:
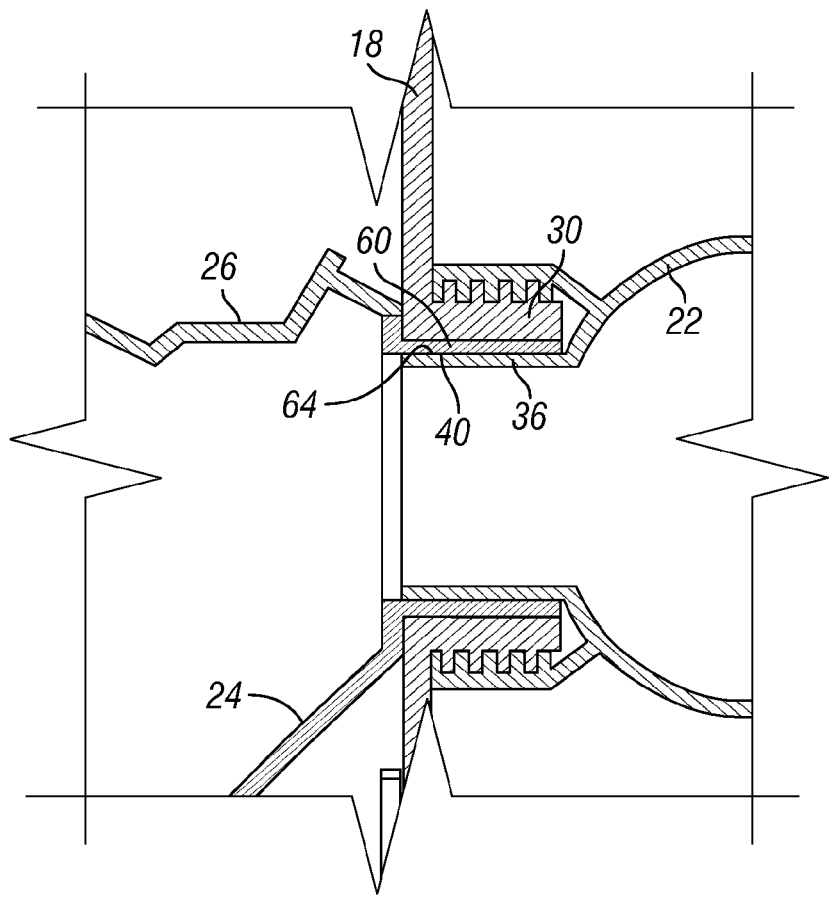
FIG. 8E is a cross sectional enlarged schematic view of the interaction of the compression tube 60 and the tube 36.
Figure 8F:
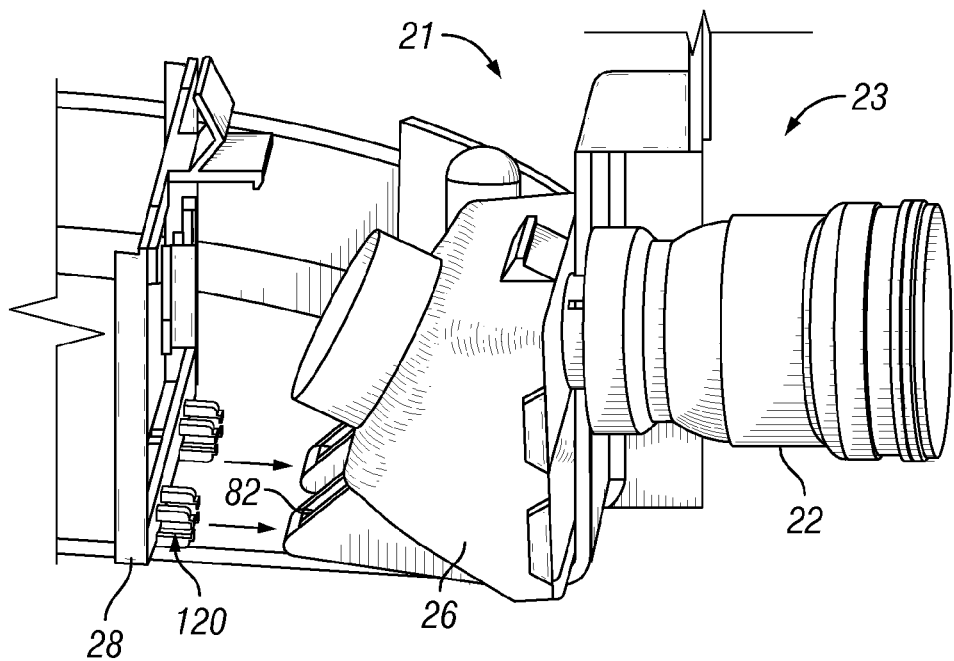
FIG. 8F is a perspective schematic view of the flange holder hingeably coupled to the outer housing inside the drum.
Figure 8G:
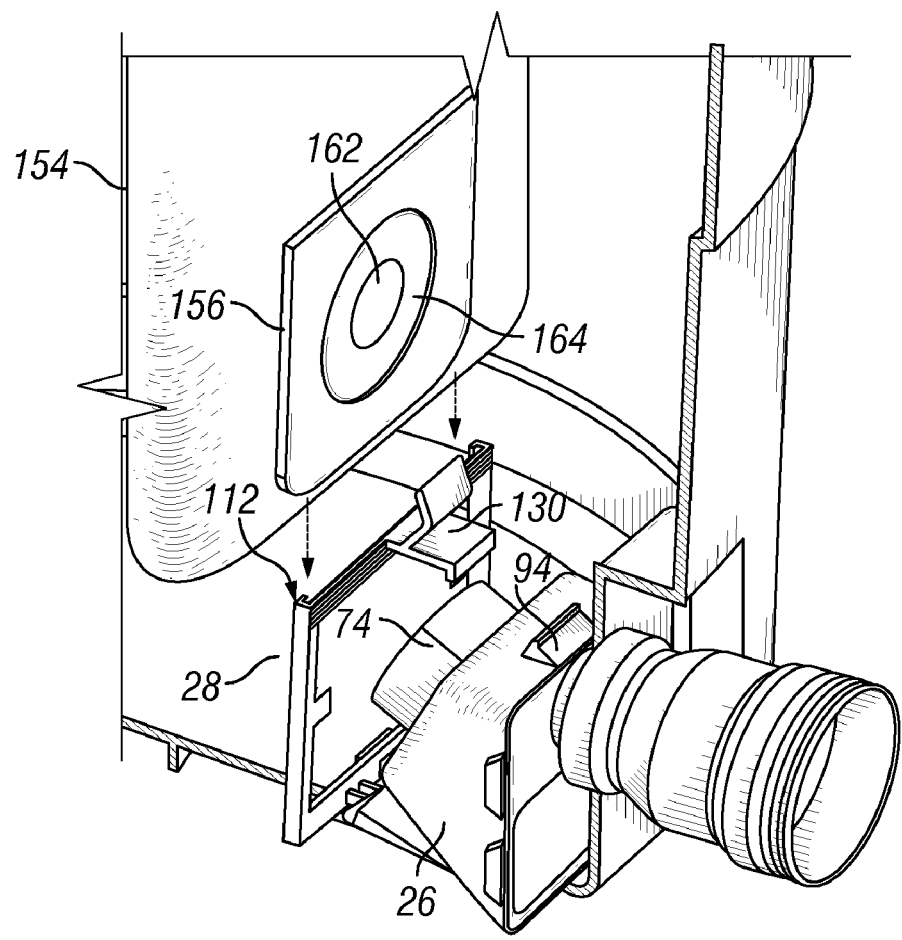
FIG. 8G is a perspective schematic view of the filter bag engageable with the flange holder.

FIG. 8A is a perspective schematic view of the inner plate coupled to the outer housing. FIG. 8B is a perspective schematic view of the inner plate and outer housing coupled to the drum opening. FIG. 8C is a perspective schematic view of the inlet coupled to the drum opening and the inner plate. FIG. 8D is a cross sectional schematic view of the inner plate and outer housing coupled to the inlet on opposite sides of the drum opening 30. FIG. 8E is a cross sectional enlarged schematic view of the interaction of the compression tube 60 and the tube 36. FIG. 8F is a perspective schematic view of the flange holder hingeably coupled to the outer housing inside the drum. FIG. 8G is a perspective schematic view of the filter bag engageable with the flange holder. The figures will be described in conjunction with each other. FIGS. 8A-8G illustrate, without limitation, various exemplary steps in assembling the adapter and coupling it to the drum wall through the opening in the drum. Thus, an existing opening, such as a drain opening in a collection drum of a wet/dry vacuum cleaner, can provide a relatively efficient and simple installation of the adapter to support the filter bag described herein.

In FIG. 8A, the inner plate 24 can be coupled with the outer housing 26 by engaging the connector 56 with the receiver 76. Other receiver/connector assemblies can be used and the position of the connector/receiver can be switched such that the outer housing includes the connector and the inner plate includes the receiver. Further, these components, and other components, can be coupled integrally to each other.

In FIG. 8B, the inner plate 24 and the outer housing 26 can be coupled to the drum wall 18 of the drum 6 on a first opening surface 158. Generally, the first opening surface 158 will be an inside portion of the drum wall 18. The tube 60 of the inner plate 24 can be inserted through the opening 30 such that the outer surface of the tube 60 is in at least proximity to the inner surface of the opening 30.

In FIG. 8C, the end 42 of the inlet 22 can be coupled from the opposite direction, that is to a second opening surface 160 of the drum 6. FIG. 8D shows the attached position of the inlet 22 with the inner plate 24 and FIG. 8E shows an enlarged view. Both figures will be described in conjunction with FIG. 8C. In at least one embodiment, the inlet 22 can be threaded with the internal threads 44 described in FIG. 3B to an external thread existent on the opening 30. Further, the tube 36, as part of the end 42, is concurrently inserted through the inner surfaces of the opening 30. The external surface 40 of the tube 36 can be sized to engage the sealing surface 64 of the tube 60. In at least one embodiment, one or more of the engagement surfaces can include a taper. As the inlet 22 is placed into position on the opening 30, the taper forces a compression fit between the inner surface of the opening 30, the tube 60, and the tube 36. This compression fit can physically secure the inner plate and the outer housing coupled to the inner plate into position on the inside of the drum by using an external connector through the inlet 22. Thus, no further attachments, supports, or fastening devices are necessary on the inside of the drum. Secondly, the compression fit can provide a sufficient seal between the inlet 22, the opening 30, and the outlet 74 of the outer housing 26 on the inside of the drum.

In FIG. 8F, the flange holder 28 can be coupled to the outer housing 26 by engaging the hinge portion 120 of the flange holder with the hinge portion 82 of the outer housing 26. The hinging action is useful to allow insertion of the filter bag and subsequent rotation and sealing of the bag with the outlet of the outer housing.

In FIG. 8G, a filter bag 154 having a filter flange 156 can be slideably engaged with the flange holder 28. The filter flange 156 can be slid into the channel 112 formed between the upper and lower flanges described in reference to FIGS. 6A, 6B. Once the filter flange is in position, the flange holder 28 can be rotated toward the outer housing 26 and latched into position using the latch portion 130 of the flange holder 28 in conjunction with the latch portion 94 of the outer housing. A flexible sealing membrane 164 surrounds an opening 162 on the filter bag to sealingly engage the outer surface of the outlet 74. The opening 162 is sized to fit over an outer surface of the outlet 74 of the outer housing 26. Thus, the first portion 21 including at least the inner plate 24 can be coupled on one side of the drum wall to a second portion 23, including at least the inlet 22 from an opposite side of the wall, such as the exterior of the drum. In at least one embodiment, the two portions can be coupled together as a self-contained adapter, independent of additional fasteners that might otherwise be attached to the vacuum cleaner. The first portion 21 can further include the outer portion 26 and the flange holder 28.

The various steps described or claimed herein can be combined with other steps, can occur in a variety of sequences unless otherwise specifically limited, various steps can be interlineated with the stated steps, and the stated steps can be split into multiple steps. Unless the context requires otherwise, the word "comprise" or variations such as "comprises" or "comprising", should be understood to imply the inclusion of at least the stated element or step, or group of elements or steps, or equivalents thereof, and not the exclusion of any other element or step, or group of elements or steps, or equivalents thereof. Also, any directions such as "top," "bottom," "left," "right," "upper," "lower," and other directions and orientations are described herein for clarity in reference to the figures and are not to be limiting of the actual device or system or use of the device or system. The device or system may be used in a number of directions and orientations.

The invention has been described in the context of preferred and other embodiments and not every embodiment of the invention has been described. Apparent modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect all such modifications and improvements to the full extent that such falls within the scope or range of equivalent of the following claims.

Further, any documents to which reference is made in the application for this patent as well as all references listed in any list of references filed with the application are hereby incorporated by reference. However, to the extent statements might be considered inconsistent with the patenting of this invention, such statements are expressly not to be considered as made by the Applicant(s).

The invention claimed is:

1. An adapter for mounting a filter bag to a collection drum in a wet/dry vacuum cleaner, the adapter comprising:
   an inlet attachable to an outside surface of the drum at an opening in the wall of the drum;
   an inner plate attachable to the inlet from an inside surface of the drum through the opening, the inner plate comprising a first plate, a first ramp plate, and a second ramp plate, wherein the first and second ramp plates form an angled ramp;

an outer housing adapted to be coupled to the inner plate on an inside of the drum; and a flange holder adapted to be coupled to the outer housing and support a flange on the filter bag placed within wherein the outer housing further comprises a foot, the foot comprising a first side and a second side spaced apart from the first side to form a hinge opening therebetween, and a cross member coupled to one or more of the sides and forming a rotational point for a hinge on the flange holder.

2. The adapter of claim 1, wherein the filter bag is supported by the flange holder independently of a removable lid on the wet/dry vacuum cleaner.

3. The adapter of claim 1, wherein the inner plate comprises a tube extendable through the opening in a first direction and the inlet comprises a tube extendable through the opening in the opposite direction of the inner plate tube and wherein the inlet tube is adapted to form a compression fit with the inner plate tube when mounted through the opening.

4. The adapter of claim 3, wherein the inlet comprises threads to engage the opening and the inlet tube is adapted to slide within the opening.

5. The adapter of claim 1, wherein the inner plate is adapted to reverse vertical orientation inside the outer housing relative to the drum depending on a height of the opening in the drum.

6. The adapter of claim 1, wherein the inlet comprises a hose connector external to the drum.

7. The adapter of claim 1, wherein the flange holder is hingeably coupled to the outer housing by way of a hinge portion on the flange holder adapted to be coupled with a hinge portion on the outer housing.

8. The adapter of claim 1, wherein the outer housing comprises an outlet extendable through the flange holder and adapted to fit through an opening in the filter bag.

9. A wet/dry vacuum cleaner having the adapter of claim 1.

10. The adapter of claim 1, wherein the opening in the drum comprises a drain opening in the drum that is located at a lower portion of the drum wall.

11. The adapter of claim 1, further comprising a cap adapted to removably cover a vacuum port on the vacuum cleaner when the inlet and inner plate are coupled with the drum opening to direct a vacuum flow through the inlet and the drum opening.

12. The adapter of claim 1, wherein the outer housing comprising a top, sides, and a bottom that converge toward a back of the housing, and an outlet disposed through the back and directed toward the interior of the collection drum.

13. The adapter of claim 1, wherein the outlet of the outer housing is adapted to contact and seal with a filter bag opening through an elastic membrane on the filter bag.

* * * * *

UNITED STATES PATENT AND TRADEMARK OFFICE
CERTIFICATE OF CORRECTION

PATENT NO.       : 8,075,650 B2                                    Page 1 of 1
APPLICATION NO.  : 11/870280
DATED            : December 13, 2011
INVENTOR(S)      : Larry D. Hale It is certified that error appears in the above-identified patent and that said Letters Patent is hereby corrected as shown below:

In Claim 1, Column 9, Line 4, the phrase --the drum-- should be inserted to read "and support a flange on the filter bag placed within the drum,"

Signed and Sealed this
Twenty-eighth Day of February, 2012

David J. Kappos
*Director of the United States Patent and Trademark Office*